US007251983B2

(12) United States Patent
Hutchinson

(10) Patent No.: US 7,251,983 B2
(45) Date of Patent: Aug. 7, 2007

(54) SECONDARY CONTAINMENT SYSTEM AND METHOD

(75) Inventor: Ray J. Hutchinson, Houma, LA (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/238,822

(22) Filed: Sep. 10, 2002

(65) Prior Publication Data

US 2004/0045343 A1 Mar. 11, 2004

(51) Int. Cl.
*G01M 3/00* (2006.01)
*G01M 3/28* (2006.01)

(52) U.S. Cl. ...................... 73/40.5 R; 73/49.1; 73/49.5

(58) Field of Classification Search ................. 73/40.5, 73/49.1, 49.5, 40.5 R See application file for complete search history.

(56) References Cited

U.S. PATENT DOCUMENTS

| | | | | |
|---|---|---|---|---|
| 2,821,993 | A | 2/1958 | Pacey | |
| 2,941,147 | A | 6/1960 | McKinlay, Jr. | |
| 2,947,147 | A | 8/1960 | Johnson | |
| 3,183,723 | A | 5/1965 | Deters | 73/40.5 |
| 3,848,765 | A | 11/1974 | Durkop | 220/9 A |
| 3,995,472 | A | 12/1976 | Murray | 73/40 |
| 4,088,987 | A * | 5/1978 | Resler et al. | 340/605 |
| 4,523,454 | A | 6/1985 | Sharp | 73/49.2 |
| 4,644,780 | A | 2/1987 | Jeter | 73/40.5 R |
| 4,653,312 | A | 3/1987 | Sharp | 588/259 |
| 4,672,366 | A | 6/1987 | Butts | 340/605 |
| 4,676,093 | A | 6/1987 | Pugnale et al. | 73/49.2 |
| 4,708,015 | A | 11/1987 | Sharp | 73/49.2 |
| 4,723,441 | A | 2/1988 | Sweeney | 73/40.5 R |
| 4,805,444 | A * | 2/1989 | Webb | 73/40.5 R |
| 4,863,710 | A | 9/1989 | Rule et al. | 423/500 |
| 4,971,477 | A | 11/1990 | Webb | 405/154 |
| 5,018,864 | A | 5/1991 | Richert | 356/635 |

(Continued)

FOREIGN PATENT DOCUMENTS

| | | |
|---|---|---|
| DE | 1258678 | 1/1968 |

(Continued)

OTHER PUBLICATIONS

Website, “Red Jacket—Quantum,” www.redjacket.com/quantum/htm, printed May 27, 2003.

(Continued)

*Primary Examiner*—Hezron Williams
*Assistant Examiner*—Samir M. Shah
(74) *Attorney, Agent, or Firm*—Withrow & Terranova, PLLC

(57) ABSTRACT

A pump housing that contains a pump that draws fuel from an underground storage tank containing fuel to deliver to fuel dispensers in a service station environment. The pump is coupled to a double-walled fuel pipe that carries the fuel from the pump to the fuel dispensers. The double-walled fuel piping contains an inner annular space that carries the fuel and an outer annular space that captures any leaked fuel from the inner annular space. The outer annular space is maintained through the fuel piping from the pump to the fuel dispensers so that the outer annular space can be pressurized by a pump to determine if a leak exists in the outer annular space or so that fuel leaked from the inner annular space can be captured by a leak containment chamber in the pump housing.

51 Claims, 7 Drawing Sheets

U.S. PATENT DOCUMENTS

| | | | | | |
|---|---|---|---|---|---|
| 5,042,290 | A | | 8/1991 | Geisinger | 73/40.5 R |
| 5,072,623 | A | | 12/1991 | Hendershot | 73/49.2 |
| 5,081,864 | A | | 1/1992 | Zaim | 73/49.2 |
| 5,098,221 | A | * | 3/1992 | Osborne | 405/52 |
| 5,115,936 | A | | 5/1992 | Bartlow | 220/426 |
| 5,117,677 | A | | 6/1992 | Hendershot et al. | 73/49.2 |
| 5,135,324 | A | | 8/1992 | Bravo | 405/52 |
| 5,158,207 | A | | 10/1992 | Van Daele | 222/52 |
| 5,184,504 | A | | 2/1993 | Spring | 73/49.2 |
| 5,263,794 | A | | 11/1993 | Webb | 405/52 |
| 5,265,652 | A | * | 11/1993 | Brunella | 141/59 |
| 5,297,896 | A | * | 3/1994 | Webb | 405/52 |
| 5,301,721 | A | * | 4/1994 | Hartmann | 141/59 |
| 5,343,191 | A | | 8/1994 | McAtamney | 340/605 |
| 5,398,976 | A | | 3/1995 | Webb | 285/93 |
| 5,400,646 | A | | 3/1995 | Kraus et al. | 73/49.2 |
| 5,408,420 | A | | 4/1995 | Slocum et al. | 364/558 |
| 5,417,553 | A | * | 5/1995 | Gibson et al. | 417/366 |
| 5,440,918 | A | | 8/1995 | Oster | 73/40.5 |
| 5,527,130 | A | | 6/1996 | Webb | 405/52 |
| 5,586,586 | A | | 12/1996 | Fiech | 141/98 |
| 5,713,607 | A | | 2/1998 | Webb | 285/123.1 |
| 5,722,699 | A | | 3/1998 | Brancher | 285/142.1 |
| 5,746,454 | A | | 5/1998 | Webb | 285/92 |
| 5,782,275 | A | | 7/1998 | Hartsell, Jr. et al. | 141/94 |
| 5,831,149 | A | | 11/1998 | Webb | 73/40.5 R |
| 5,911,155 | A | | 6/1999 | Webb | 73/40.5 R |
| 5,927,762 | A | | 7/1999 | Webb | 285/123.15 |
| 5,975,110 | A | * | 11/1999 | Sharp | 137/234.6 |
| 5,975,132 | A | | 11/1999 | Gleeson | 137/571 |
| 6,029,505 | A | | 2/2000 | Webb | 73/40.5 R |
| 6,032,699 | A | | 3/2000 | Cochran | 138/104 |
| 6,067,527 | A | | 5/2000 | Lovell et al. | 705/21 |
| 6,070,760 | A | | 6/2000 | Kenney | 222/55 |
| 6,116,815 | A | | 9/2000 | Chen | 405/52 |
| 6,126,409 | A | | 10/2000 | Young | 417/297 |
| 6,223,765 | B1 | | 5/2001 | Small et al. | 137/312 |
| 6,489,894 | B2 | * | 12/2002 | Berg | 340/605 |
| 6,523,581 | B2 | | 2/2003 | Pendleton et al. | 141/86 |
| 6,682,309 | B2 | * | 1/2004 | Reid | 417/36 |
| 6,817,409 | B2 | * | 11/2004 | Howard | 166/108 |
| 6,854,517 | B2 | * | 2/2005 | Gay et al. | 166/369 |
| 6,926,504 | B2 | * | 8/2005 | Howard | 417/417 |
| 6,935,161 | B2 | * | 8/2005 | Hutchinson | 73/40.5 R |
| 2002/0044060 | A1 | | 4/2002 | Berg | 340/605 |
| 2002/0197174 | A1 | * | 12/2002 | Howard | 417/417 |
| 2003/0113219 | A1 | * | 6/2003 | Gibson et al. | 417/423.14 |
| 2004/0234338 | A1 | | 11/2004 | Monroe et al. | 405/54 |

FOREIGN PATENT DOCUMENTS

| | | | |
|---|---|---|---|
| DE | 2900960 | | 7/1979 |
| EP | 0931761 | A1 | 1/1999 |
| EP | 1179505 | A1 | 2/2002 |
| JP | 2000274378 | A | 10/2000 |
| WO | WO 86/07446 | | 12/1986 |

OTHER PUBLICATIONS

Website, "Veeder-Root—Interstitial Steel Tanks," www.veeder-root.com/dynamic/index.cfm?pageID=175, printed May 27, 2003.

* cited by examiner

SECONDARY CONTAINMENT SYSTEM AND METHOD

FIELD OF THE INVENTION

The present invention relates to coupling the inner annular space and the outer annular space of a double-walled fuel pipe to a pump housing that carries fuel from an underground storage tank to a fuel dispenser.

BACKGROUND OF THE INVENTION

In service station environments, fuel is delivered to fuel dispensers from underground storage tanks. The underground storage tanks are large containers located beneath the ground that contain fuel. A separate underground storage tank is provided for each fuel type, such as low octane gasoline, high octane gasoline, and diesel fuel. In order to deliver the fuel from the underground storage tanks to the fuel dispensers, a pump is provided that draws the fuel out of the underground storage tank and delivers the fuel through a main fuel piping conduit that runs beneath the ground in the service station. The pump may be a "submersible turbine pump." An example of a submersible turbine pump can be found in U.S. Pat. No. 6,223,765 assigned to Marley Pump Company. Branch conduits from each fuel dispenser are coupled to the main fuel piping conduit so that fuel from the branch conduit can be delivered to the fuel dispenser.

Due to regulatory requirements governing service stations, the main conduit fuel piping is usually required to be double-walled piping. Double-walled piping contains an inner annular space that carries the fuel. An outer annular space surrounds the inner annular space so as to capture and contain any leaks that occur in the inner annular space. An example of double-walled fuel pipe can be found in U.S. Pat. No. 5,527,130, incorporated herein by reference in its entirety.

It is possible that the outer annular space of the double-walled fuel piping could fail thereby leaking fuel outside of the fuel piping if the inner annular space were to fail as well. Fuel sump sensors that detect leaks are located underneath the ground in the submersible turbine pump sump and the fuel dispenser sumps. These sensors detect any leaks that occur in the fuel piping at the location of the sensors. However, if a leak occurs in the double-walled fuel piping in between these sensors, it is possible that a leak in the double-walled fuel piping will go undetected since the leaked fuel will leak into the ground never reaching one of the fuel leak sensors. The submersible turbine pump will continue to operate as normal drawing fuel from the underground storage tank; however, the fuel may leak to the ground instead of being delivered to the fuel dispensers.

Therefore, there exists a need to be able to monitor the entire double-walled fuel piping system to determine if there is a leak in the double-walled fuel piping that could cause fuel to leak outside of the double-walled fuel piping.

SUMMARY OF THE INVENTION

The present invention relates to coupling the secondary containment system of a service station to a pump housing that is used to draw fuel from an underground storage tank to be delivered to fuel dispensers. The secondary containment system is usually provided in the form of a double-walled fuel pipe that carries fuel from the pump to the fuel dispensers. The double-walled fuel piping is comprised of an inner annular space that provides the delivery path for fuel, surrounded by an outer annular space. Double-walled fuel piping is typically required when fuel piping is exposed to the ground so that any leaks that occur in the inner annular space of the double-walled fuel piping are contained in the outer annular space of the double-walled fuel piping.

In one embodiment, the inner and outer annular spaces of the fuel piping are run back into the pump housing. In this manner, a pressure generating source in the pump housing can exert a pressure in the outer annular space of the fuel piping to pressurize the outer annular space to a negative pressure thereby preventing any fuel that leaks from the inner annular space to the outer annular space from leaking outside of the fuel piping.

The pressure generating device that generates a pressure in the outer annular space of the fuel piping may be generated by the same pump that draws fuel out of the underground storage tank, or a separate secondary pump. One type of pump that draws fuel out of the underground storage tank is referred to as a "submersible turbine pump." In the case of a secondary pump, the same electronics in the submersible turbine pump housing that drives the submersible turbine pump may also drive the secondary pump.

In an alternative embodiment, a bypass tube couples the outer annular space of the double-walled fuel piping to the pump housing instead of the outer annular space being run directly into the housing.

The pressure generating device generates a pressure in the outer annular space, and a control system monitors the pressure in the outer annular space using a pressure sensor. The control system may be in the pump housing, a tank monitor, site controller, fuel dispenser, or other control system. Changes in pressure in the outer annular space may be indicative that a leak or breach has occurred in the outer annular space of the fuel piping such that a fuel leak would occur if the inner annular space of the fuel piping occurs. Repeating lowering pressure changes over the same amount of time are typically indicative of thermal effects rather than leaks in the outer annular space. Repeating pressure changes that are the same or greater over the same amount and/or large changes in pressure are typically indicative of a breach or leak in the outer annular space.

If a breach or leak is detected in the outer annular space, an alarm may be generated, and the pump that draws fuel out of the underground storage tank may be shut down in order to prevent and/or stop any fuel leaks from occurring underneath and the ground and/or in the service station environment.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
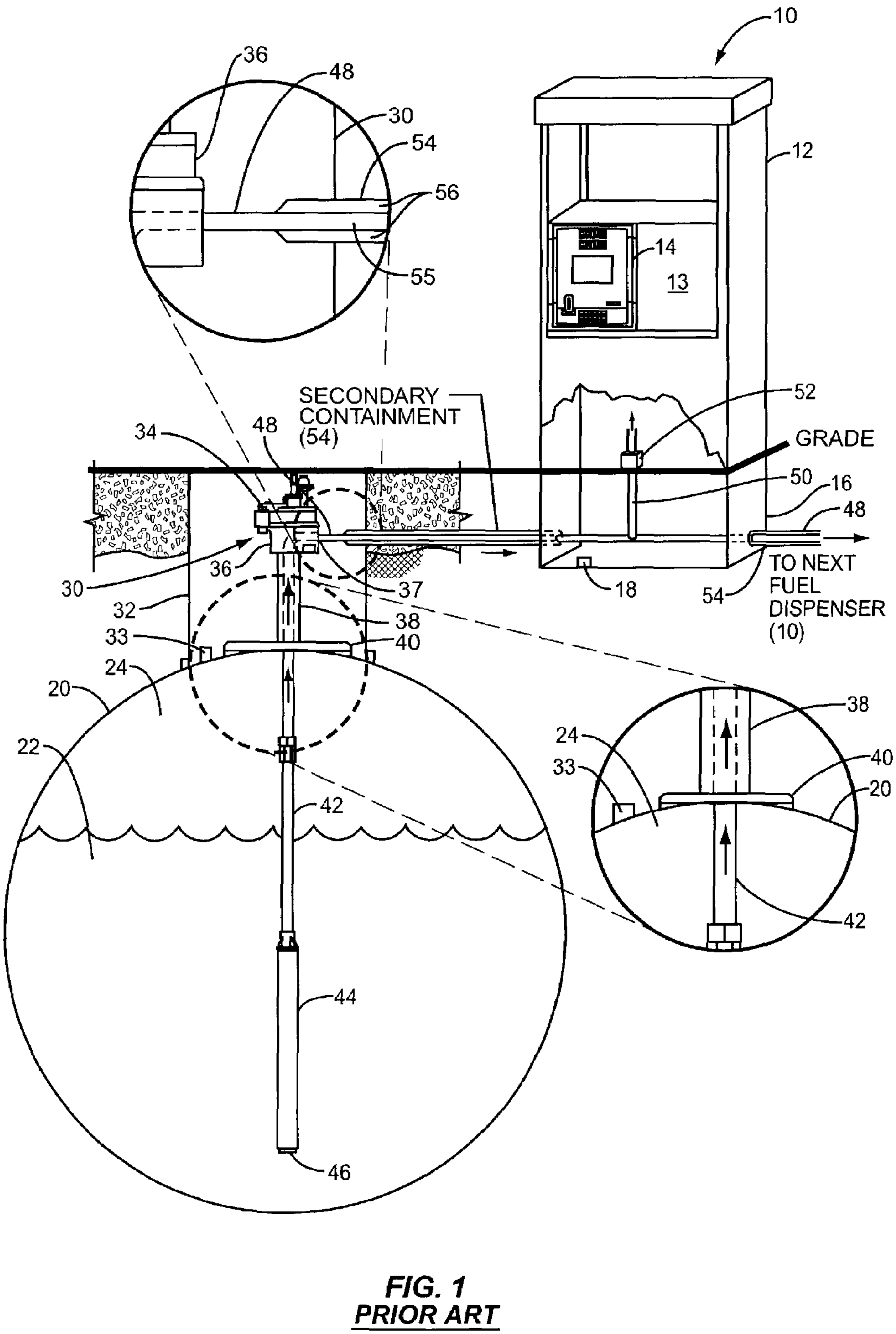
FIG. 1 PRIOR ART
FIG. 1 is an underground storage tank, submersible turbine pump and fuel dispenser system in a service station environment in the prior art.

FIG. 1 illustrates a fuel delivery system known in the prior art for a service station environment. A fuel dispenser 10 is provided that delivers fuel 22 from an underground storage tank 20 to a vehicle (not shown). The fuel dispenser 10 is comprised of a fuel dispenser housing 12 that typically contains a control system 13 and a display 14. The fuel dispenser 10 contains valves and meters (not shown) to allow fuel 22 to be received from underground piping and delivered through a hose and nozzle (not shown). More information on a typical fuel dispenser 10 can be found in U.S. Pat. No. 5,782,275, assigned to same assignee as the present invention, incorporated herein by reference in its entirety.

Fuel 22 that is dispensed by the fuel dispenser 10 is stored beneath the ground in an underground storage tank 20. There may be a plurality of underground storage tanks 20 in a service station environment if more than one type of fuel 22 is provided to be delivered by the fuel dispenser 10. For example, one underground storage tank 20 may contain a high octane of gasoline, another underground storage tank 20 may contain a low octane of gasoline, and yet another underground storage tank 20 may contain diesel. The fuel 22 in the underground storage tank 20 rests at the bottom of the underground storage tank 20. The empty space above the fuel 22 in the underground storage tank 20 is the ullage area 24. The ullage area 24 contains a vapor/air mixture. More information on underground storage tanks 20 in service station environments can be found in U.S. Pat. No. 6,116,815, incorporated herein by reference in its entirety.

A method is provided of delivering the fuel 22 from the underground storage tank 20 to the fuel dispenser 10. Typically, a submersible turbine pump 30 is provided, like that illustrated in FIG. 1, to draw the fuel 22 from the underground storage tank 20 and deliver the fuel 22 to the fuel dispenser 10. The submersible turbine pump 30 is contained in a submersible turbine pump sump 32 so that any leaks that occur in the submersible turbine pump 30 are contained within the submersible turbine pump sump 32 and are not leaked to the ground. A submersible turbine pump sump sensor 33 is provided inside the submersible turbine pump sump 32 to detect any such leaks so that the submersible turbine pump sump 32 can be periodically serviced to remove any leaked fuel 22.

The submersible turbine pump 30 is comprised of submersible turbine pump electronics 34 (which can also be referred to simply as "electronics") contained in a submersible turbine pump housing 36. The submersible turbine pump housing 36 is connected to a riser pipe 38 that is mounted using a mount 40 connected to the top of the underground storage tank 20. A pipe extends from the submersible turbine pump housing 36 down through the riser pipe 38 and into the underground storage tank 20 in the form of a boom 42. The boom 42 is coupled to a turbine housing 44 that contains a turbine or also called a "turbine pump" (not shown), both of which terms can be used interchangeably. The turbine is electrically coupled to the submersible turbine pump electronics 34 in the submersible turbine pump housing 36. The submersible turbine pump electronics 34 causes the turbine inside the turbine housing 44 to rotate to create a pressure inside the boom 42. This pressure causes fuel 22 to be drawn through the turbine housing 44 through a turbine housing inlet 46 through the boom 42 which extends inside the riser pipe 38 into the submersible turbine pump housing 36. A fluid connection is made between the boom 42 carrying the fuel 22 and an outlet orifice 37 on the side of the submersible turbine pump housing 36.

A main conduit fuel piping 48 is coupled to the submersible turbine pump housing 36 and/or outlet orifice 37 to receive the fuel 22 drawn from the underground storage tank 20. This fuel 22 is delivered via the main conduit fuel piping 48 to each of the fuel dispensers 10 in the service station environment. Typically, regulatory requirements require that any main conduit fuel piping 48 exposed to the ground be contained within a housing or other structure so that any leaked fuel 22 from the main conduit fuel piping conduit 48 is captured. Typically, this secondary containment is provided in the form of a double-walled main conduit fuel piping 48, as illustrated in FIG. 1. The double-walled main conduit fuel piping 48 contains an inner annular space 55 surrounded by an outer annular space 56. In FIG. 1 and in prior art systems, the outer annular space 56 runs through the submersible turbine pump sump 32 wall and is clamped to the inner annular space 55 to terminate once inside the submersible turbine pump sump 32. This is because the submersible turbine pump sump 32 provides the secondary containment of the inner annular space 55.

The main conduit fuel piping 48, in the form of a double-walled pipe, is run underneath the ground in a horizontal manner to each of the fuel dispensers 10. Each fuel dispenser 10 is placed on top of a fuel dispenser sump 16 that is located beneath the ground underneath the fuel dispenser 10. The fuel dispenser sump 16 captures any leaked fuel 22 that drains from the fuel dispenser 10 and its internal components so that such fuel 22 is not leaked to the ground. The main conduit fuel piping 48 is run into the fuel dispenser sump 16, and a branch conduit 50 is coupled to the main conduit fuel piping 48 to deliver fuel 22 into each individual fuel dispenser 10. The branch conduit 50 is typically run into a shear valve 52 located proximate to ground level so that any impact to the fuel dispenser 10 causes the shear valve 52 to engage, thereby shutting off the fuel dispenser 10 access to fuel 22 from the branch conduit 50. The main conduit fuel piping 48 exits the fuel dispenser sump 16 so that fuel 22 can be delivered to the next fuel dispenser 10, and so on until a final termination is made. A fuel dispenser sump sensor 18 is typically placed in the fuel dispenser sump 16 so that any leaked fuel from the fuel dispenser 10 or the main conduit fuel piping 48 and/or branch conduit 50 that is inside the fuel dispenser sump 16 can be detected and reported accordingly.

Figure 2:
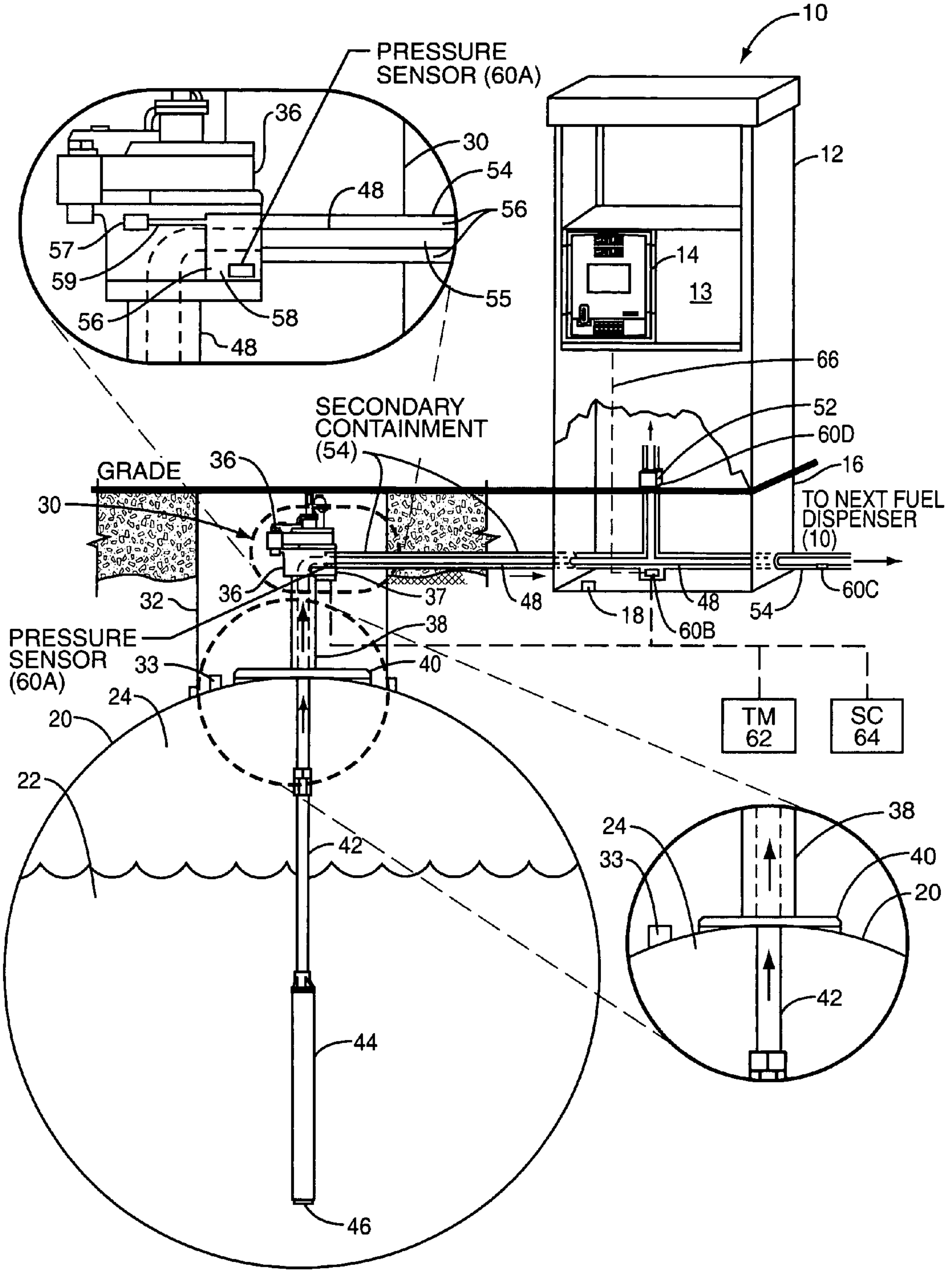
FIG. 2 is a schematic diagram of the double-walled fuel piping extending into the submersible turbine pump housing.

FIG. 2 illustrates a fuel delivery system in a service station environment according to one embodiment of the present invention. The secondary containment 54 provided by the outer annular space 56 of the main conduit fuel piping 48 is run through the submersible turbine pump sump 32 and into the submersible turbine pump housing 36, as illustrated. In this manner, pressure created by the submersible turbine pump 30 can also be applied to the outer annular space 56 of the main conduit fuel piping 48 to detect leaks, as will be discussed later in this patent application.

Pressure sensors may be placed in the outer annular space 56 in a variety of locations, including but not limited to inside the submersible turbine pump housing 36 (60A), in the outer annular space 56 inside the fuel dispenser sump 16 (60B), in the outer annular space 56 of the main conduit fuel piping 48 exposed to the ground (60C), and/or in the outer annular space 56 that extends to the sheer valve 52 (60D). In the embodiment illustrated in FIG. 2, the outer annular space 56 of the main conduit fuel piping 48 is run inside the submersible turbine pump housing 36 so that any leaked fuel into the outer annular space 56 can be drawn back to the submersible turbine pump housing 36 and collected in a leaked fuel containment chamber 58. By running the outer annular space 56 of the main conduit fuel piping 48 inside the submersible turbine pump housing 36, it is possible to provide a pressure in the outer annular space 56 from the same submersible turbine pump 30 pressure that draws fuel 22 from the underground storage tank 20 via the boom 42, or a separate pump (not shown) that may be contained inside the submersible turbine pump housing 36 or in another location coupled to the submersible turbine pump housing 36 in order to generate a pressure in the outer annular space 56.

In the case of the submersible turbine pump 30 providing the pressure generating source for the outer annular space 56, any method of accomplishing this function is contemplated by the present invention. One method may be to use a siphon system in the submersible turbine pump 30 to create a pressure in the outer annular space 56, such as the siphon system described in U.S. Pat. No. 6,223,765 (labeled as element 166 in FIGS. 8 and 9 of the '765 patent), assigned to Marley Pump Company and assigned herein by reference its entirety. As described in the '765 patent, the siphon system includes a siphon tube (labeled as element 208 in FIGS. 2, 8, and 9 of the '765 patent) whereby a vacuum is generated by the siphon system on a system to which the siphon tube is connected. FIG. 2 illustrates a siphon system 57 like that of the '765 patent whereby a siphon tube 59 like that of the '765 patent may be coupled to the outer annular space 56 to draw a vacuum in the outer annular space 56 as discussed above. Another method is to direct some of the pressure generated by the submersible turbine pump 30 from inside of the boom 42 to the outer annular space 56. The present invention is not limited to any particular method of the submersible turbine pump 30 providing pressure to the outer annular space 56 for this embodiment.

In the case of a second pump provided in a submersible turbine pump housing 36, the submersible turbine pump electronics 34 may also be used to provide power to the second pump. Also, the second pump may not be located in the submersible turbine pump housing 36, but only coupled to the submersible turbine pump housing 36 in order to generate a pressure in the outer annular space 56.

Figure 3:
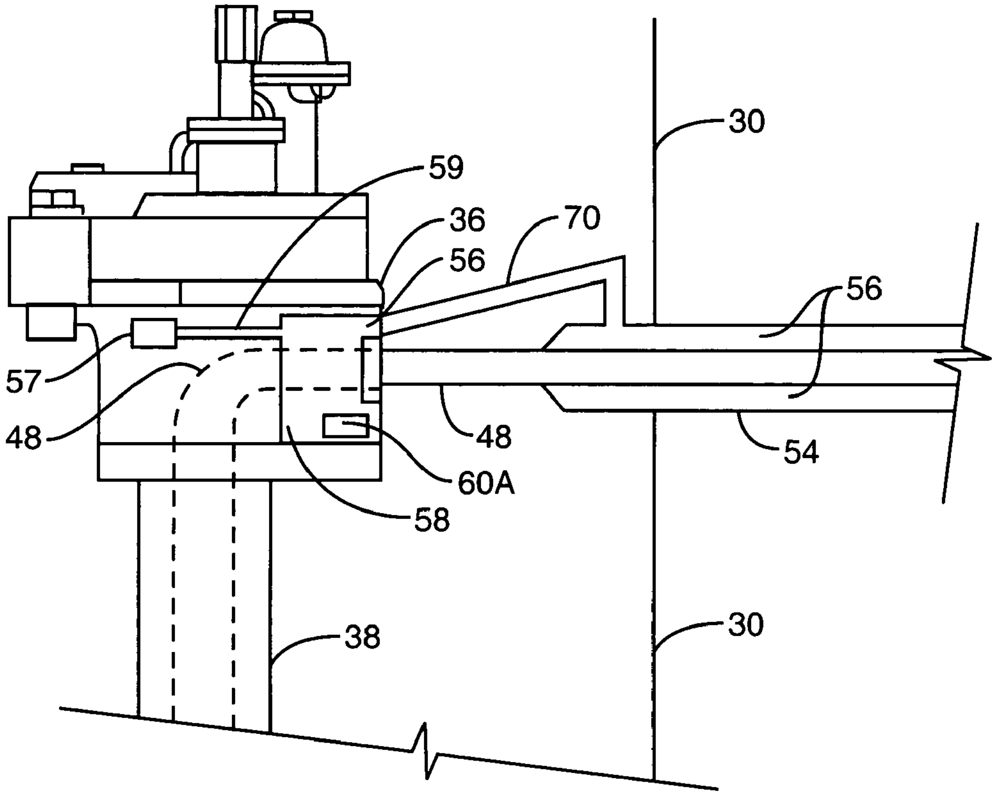
FIG. 3 is a schematic diagram of an alternative embodiment illustrated in FIG. 2 wherein a bypass tube couples the outer annular space of the double-walled fuel piping to the submersible turbine pump housing.

FIG. 3 illustrates an alternative embodiment of running the outer annular space 56 of the main conduit fuel piping 48 into the submersible turbine pump housing 36 instead of the outer annular space 56 being directly run with the inner annular space 55 into the submersible turbine pump housing 36. A bypass tube 70 connects the outer annular space 56 inside of the submersible turbine pump housing 36 via a second orifice. Again, the outer annular space 56 may be coupled to a leaked fuel containment chamber 58 that collects any leaked fuel 22 from the inner annular space 55 captured by the outer annular space 56. A pressure sensor 60A is placed in the leaked fuel containment chamber 58 to detect any pressure changes in the outer annular space 56 to determine if a leak exists, as will be described later in this patent application. Alternatively, the pressure sensor may be located in other locations in the outer annular space 56 as shown in FIG. 2 by pressure sensors 60B, 60C, 60D. As discussed above in FIG. 2, FIG. 3 may include as siphon system 57 like that of the '765 patent whereby a siphon tube 59 like that of the '765 patent may be coupled to the outer annular space 56 to draw a vacuum in the outer annular space 56 as discussed above.

Figure 4:
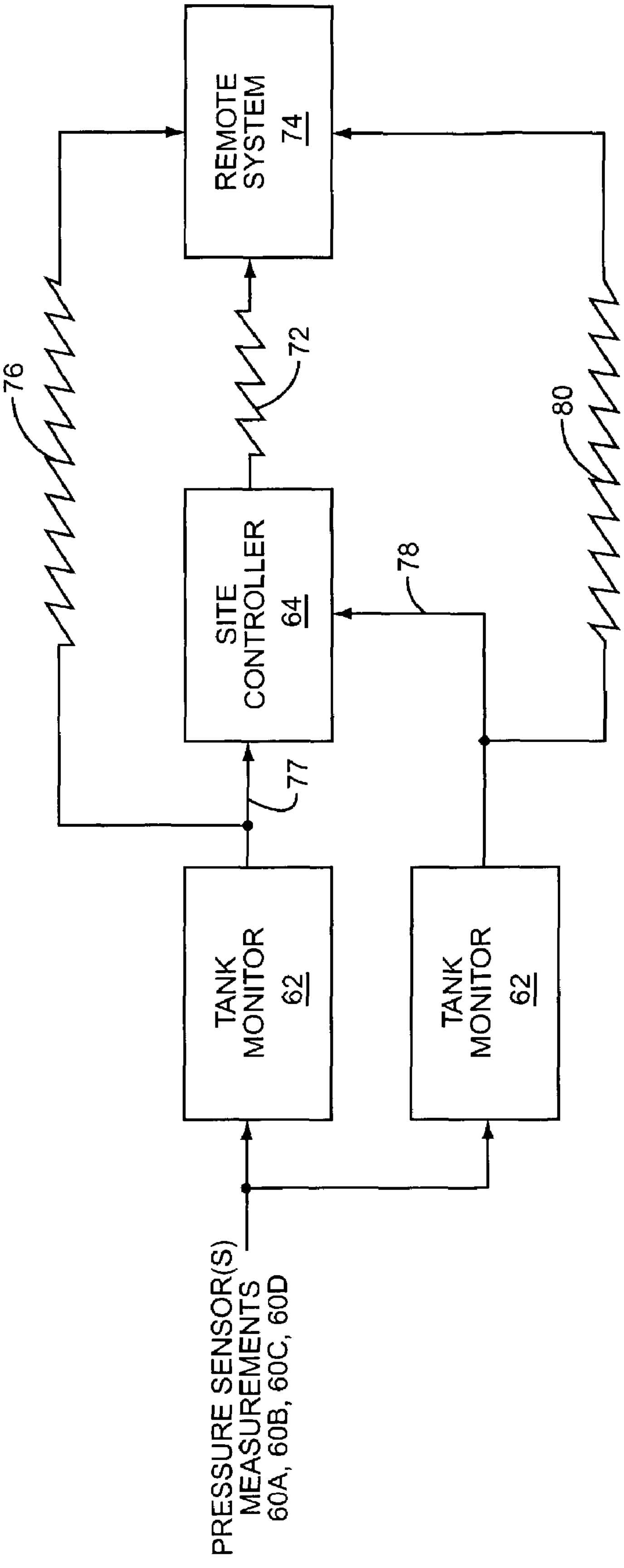
FIG. 4 is a schematic diagram of a pressure sensor communication system.

FIG. 4 illustrates a communication system whereby readings from the pressure sensors 60A, 60B, 60C, 60D can be communicated to a control system. The pressure sensor 60A, 60B, 60C, 60D may be coupled to a tank monitor 62, such as the TLS-350 manufactured by Veeder-Root Company. The pressure sensors 60A, 60B, 60C, 60D may also be coupled to a fuel dispenser 10 and or its control system 13. The tank monitor 62 and/or fuel dispenser 10 and its control system 13 may be additionally coupled via the tank monitor site controller communication link 77 and fuel dispenser site controller communication line 78, respectively, to a site controller 64. The site controller 64 controls the operation of the fuel dispensers 10 as well as providing information regarding inventory levels and other status of the fuel dispenser 10 and tank monitor 62 readings. An example of a site controller 64 is the G-Site® manufactured by Gilbarco Inc., and is described generally in U.S. Pat. No. 6,067,527, assigned to the same assigned as the present invention and incorporated herein by reference in its entirety. The site controller 64 may communicate the pressure sensor measurements 60A, 60B, 60C, 60D to a remote system 74 using a remote communication line 72. Also, a fuel dispenser 10 and/or its control system 13 and the tank monitor 62 may communicate the pressure sensor measurements 60A, 60B, 60C, 60D directly to the remote system 74 via remote communication lines 76 or 80 instead of communicating such information through the site controller 64 first. A control system, which may be provided in the tank monitor 62, the fuel dispenser 10, and/or its control system 13, or the site controller 64 and/or the remote system 74, carries out the operational aspects of the present invention may be carried out as described in FIGS. 5A and 5B below.

Figure 5A:
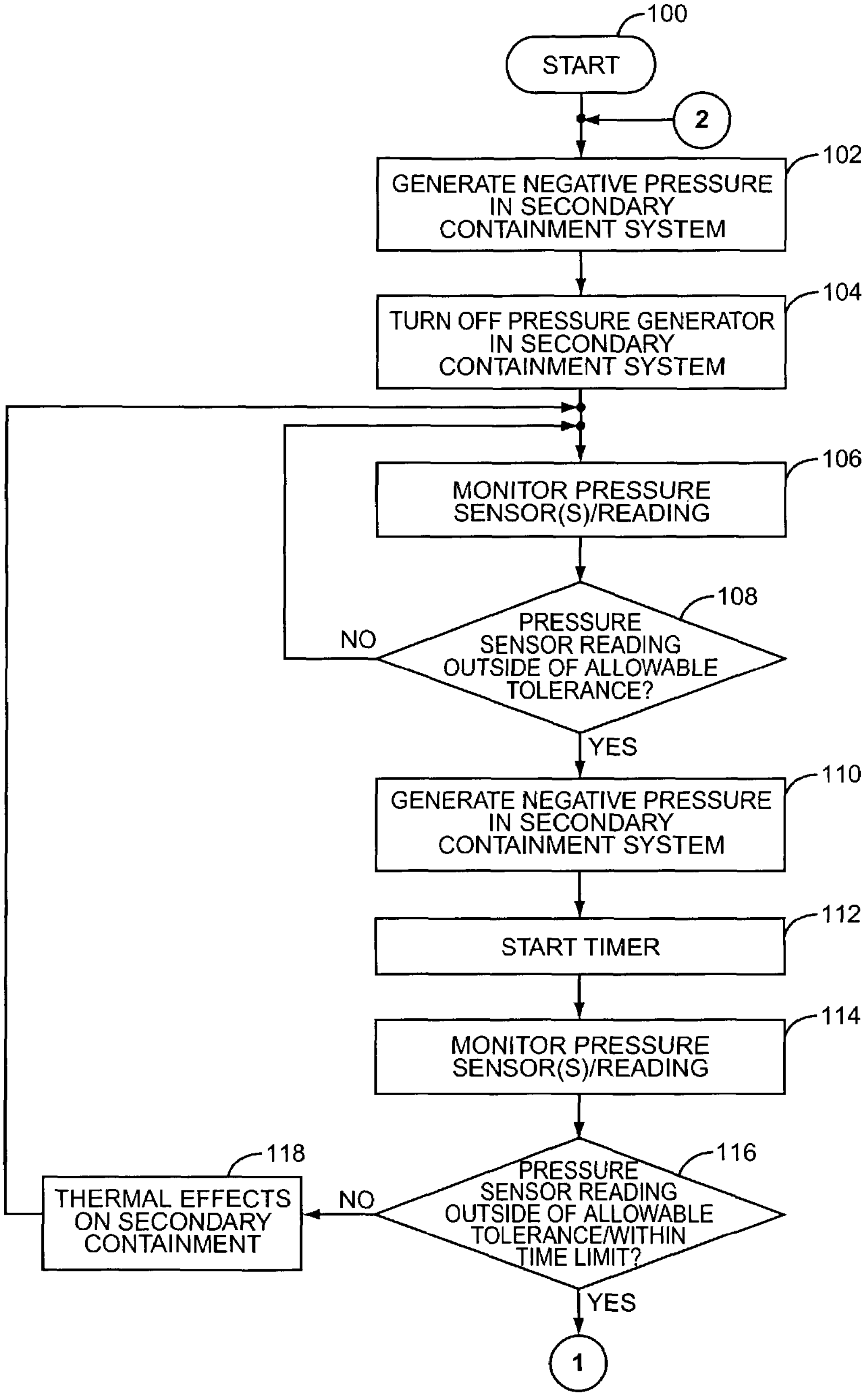
FIGS. 5A and 5B are flowcharts illustrating one operational embodiment of the present invention.
Figure 5B:
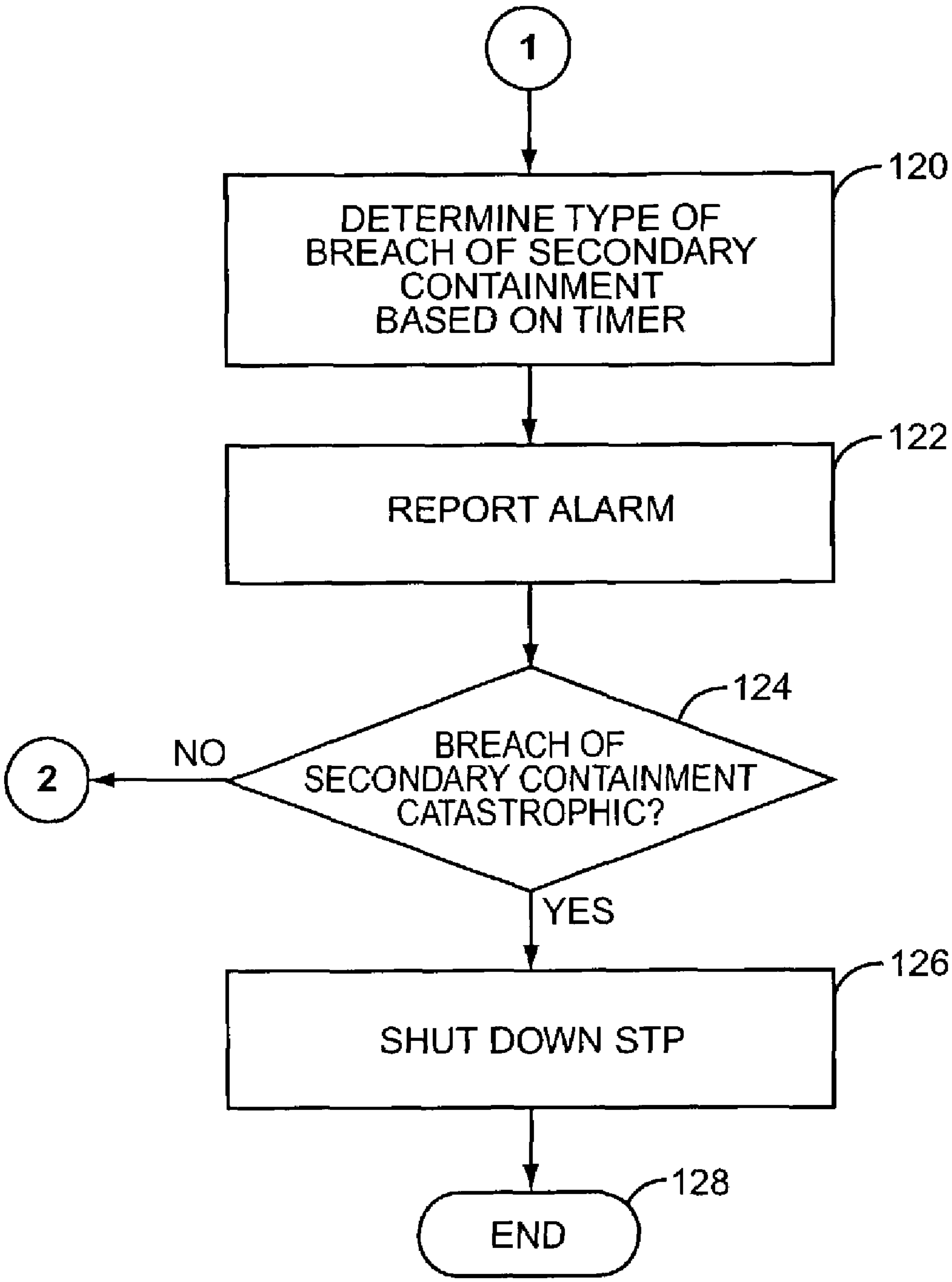

FIG. 5A describes the operational aspects of the present invention whereby the pressure in the outer annular space 56 of the main conduit fuel piping 48 is monitored to determine if a leak exists. It is because of the coupling of the outer annular space 56 into the submersible turbine pump housing 36 that it is possible to provide a pressure-generating source, such as the submersible turbine pump 30 or a second pump, to generate a pressure in the outer annular space 56. A disruption in the pressure from normal conditions in the outer annular space 56 may be indicative of a breach or leak in the outer annular space 56 of the main conduit fuel piping 48. If there is a leak or breach in the outer annular space 56 of the main conduit fuel piping 48, this is indicative of the possibility that a leak in the inner annular space 55 of the main conduit fuel piping 48 would not necessarily be contained by the outer annular space 56 and therefore would leak to the ground causing an undesirable result.

In FIG. 5A, a process is described that is executed by a control system. The process starts (block 100), and a negative pressure is generated in the secondary containment system 54, namely the outer annular space 56 of the main conduit fuel piping 48 (block 102). If the pressure-generating source provided to the outer annular space 56 of the main conduit fuel piping 48 is the submersible turbine pump 30, the pressure-generating device operation for generating a pressure in the outer annular space 56 will be dictated by the normal designed operating conditions for the submersible turbine pump 30 (block 104). For example, when no fuel dispensers 10 are dispensing fuel 22, the submersible turbine pump 30 is turned off. If the submersible turbine pump 30 is not the pressure generator that generates the pressure in the outer annular space 56, then the pressure-generating device is turned off (block 104). What is important is that a characteristic pressure be generated inside the outer annular space 56 so that any anomalies indicative of a leak in the outer annular space 56 can be detected.

Next, readings from the pressure sensors 60A, 60B, 60C, 60D are monitored by the control system (block 106). If a pressure sensor 60A, 60B, 60C, 60D reading is not outside an allowable tolerance from the expected pressure in the outer annular space 56 (decision 108), the system continues to repeat monitoring the pressure sensors 60A, 60B, 60C, 60D readings (block 106). If a pressure sensor 60A, 60B, 60C, 60D reading is outside the allowable tolerance (decision 108), the pressure-generating source is caused to generate a negative pressure in the outer annular space 56 (block 110). This step will comprise turning on the pressure-generating device if it is currently turned off. If the pressure-generating device is turned on, then the pressure-generating device will be left on. Next, a timer is started in the control system (block 112) and the pressure sensor 60A, 60B, 60C, 60D readings are again monitored by the control system (block 114). At this point, the control system does not know if the change in pressure outside of the tolerance (decision 106) is from thermal effects or a leak in the outer annular space 56 or both.

If the pressure sensor 60A, 60B, 60C, 60D readings show the same change in pressure over a longer period of time than the timing of previous same change in pressure in the outer annular space 56 as prescribed by the control system (decision 116), this is indicative that the change in pressure in the outer annular space 56 is due to thermal effects. Thermal effects may cause a change in pressure in the outer annular space 56, but this change in pressure will be generated over longer periods of time until virtually nil if no other leaks are in the outer annular space 56. Any thermal effects that occurs is noted by the control system (block 118), and the process repeats, going back to block 106.

If the pressure sensor 60A, 60B, 60C, 60D readings are outside the allowable tolerance within the time limit prescribed by the control system indicating that the time for the change in the same amount of pressure is not decreasing (decision 116), the control system is programmed to indicate this situation as a leak in the outer annular space 56. The process continues onto FIG. 5B for the control system to determine the type of breach of the secondary containment 54 based on the amount of time it took for the pressure readings of pressure inside the outer annular space 56 to go outside the allowable tolerances. If the pressure reading falls outside the allowable pressure tolerance very quickly, this is an indication of a large leak in the outer annular space 56. A longer amount of time is indicative of a smaller leak, since the pressure in the outer annular space 56 degraded over a longer period of time. No matter what type of leak is detected, an alarm condition is generated (block 122) and communicated to any of the reporting systems illustrated in FIG. 4 or other system that is designed to capture such alarms.

The control system next determines if the breach of the secondary containment 54 is a result of a catastrophic event (decision 124). If not, the process continues to repeat again by returning to block 102 in FIG. 5A. If yes, the submersible turbine pump 30 is shut down so that no fuel 22 is continued to be delivered to the main conduit fuel piping 48 in case the inner annular space 55 contains a leak that will then leak out of the leak in the outer annular space 56 to the ground, and the process ends (block 128). In order to continue the operation of the system, it may be necessary for service personnel to come to the service station to determine the location of the leak in the outer annular space 56 and to take the appropriate correction measures required. Alternatively, the control system may be designed to reinitialize the system based on defined criteria.

Figure 6:
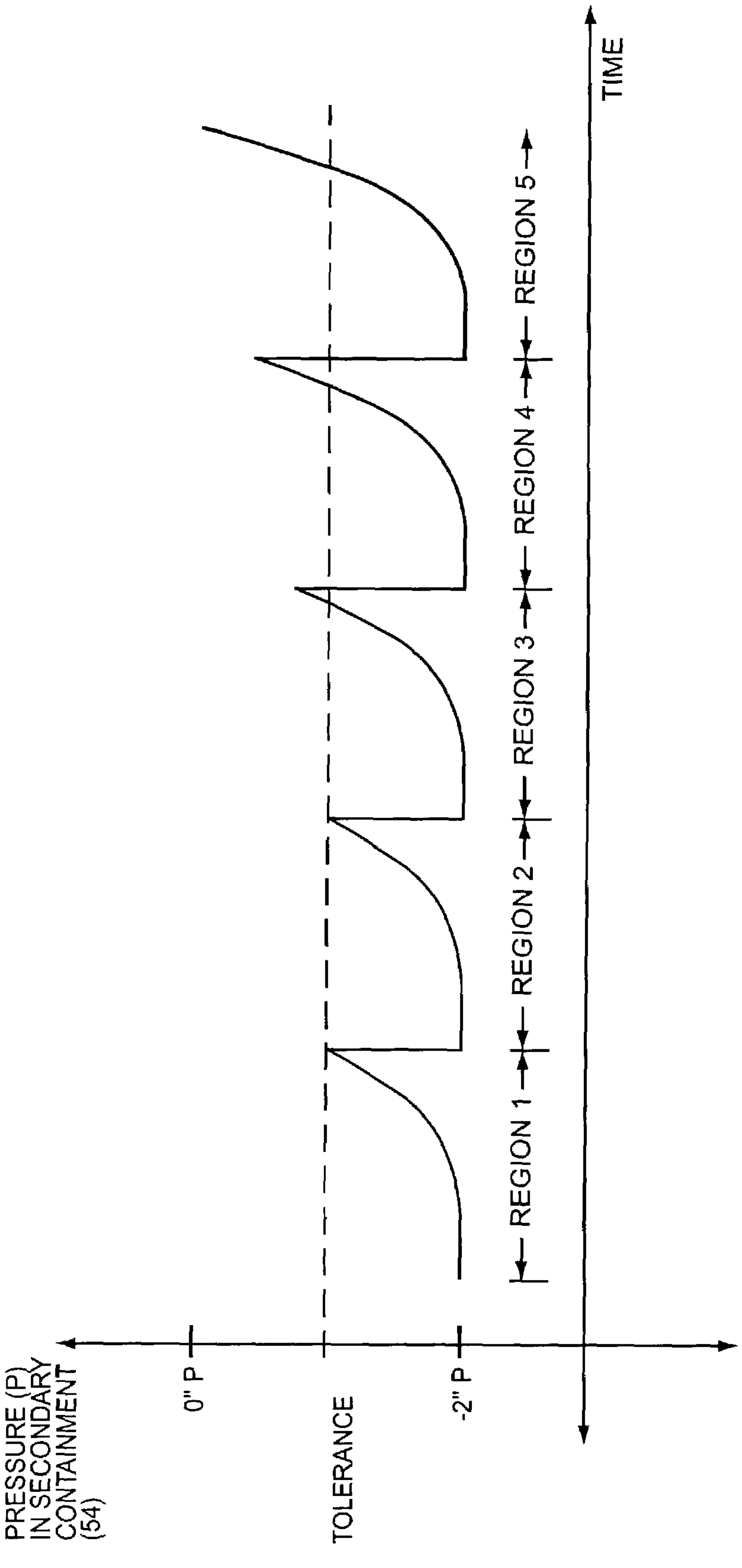
FIG. 6 is a schematic diagram showing a possible pressure characteristic curve over time in the outer annular space of the double-walled fuel piping.

FIG. 6 illustrates the possible scenario of a pressure reading in the secondary containment system, namely the outer annular space 56 of the main conduit fuel piping 48. Note, however, that this is merely an example of a possible pressure to timing graph in the outer annular space 56 and is not necessarily indicative of all systems. Assuming that the pressure-generating device in the outer annular space 56 provides a steady state pressure of negative 2 inches of water column, the process starts and the control system determines a pressure change in the outer annular space 56 rising as shown in Region 1 of FIG. 6. The pressure-generating device is turned on, and the pressure in the outer annular space 56 drops back down to negative 2 inches of water column. This is indicative of either the outer annular space 56 containing a small leak that can be compensated for by the pressure generated by the pressure-generating device in the outer annular space 56, or thermal effects occurring in the outer annular space 56.

Again in Region 2, the pressure in the outer annular space 56 rises to a point where it is outside an allowable tolerance, and the pressure-generating device is activated when the pressure in the outer annular space 56 falls back down to the steady state pressure in less amount of time than it took for the pressure to rise in the Region 1. This is indicative that the pressure in the outer annular space 56 was possibly caused by thermal effect and hence no alarm is generated since the pressure change is decreasing over time.

In Region 3, again the pressure in the outer annular space 56 rises above the allowable tolerance level, and the pressure-generating device is turned on to lower the pressure back down to the steady state pressure.

In Region 4, the pressure in the outer annular space 56 again rises, going outside the tolerance limit and beyond the previous pressure in Region 3. This is indicative of the fact that the pressure rise in the outer annular space 56 is not repeating from the previous pressure reading and therefore is not a result of thermal effects. An alarm would be generated in this instance indicating that a breach of the secondary containment system 54 has occurred. Also, if in Region 4, the change in pressure was the same amount as shown in Region 3, but the change in pressure in Region 4 occurred in the same or longer period of time as it occurred in Region 3, this would also be indicative of a leak in the outer annular space 56 and not due to thermal effects.

In Region 5, a catastrophic leak is shown wherein the pressure rises in the outer annular space 56 outside the tolerance and to a level wherein activating the pressure-generating device in the outer annular space 56 cannot cause the pressure in the outer annular space 56 to either fall at all or fall back to the steady state pressure. This is indicative of a catastrophic leak.

Those skilled in the art will recognize improvements and modifications to the preferred embodiments of the present invention. All such improvements and modifications are considered within the scope of the concepts disclosed herein and the claims that follow.

What is claimed is:

1. A device for drawing fuel out of an underground storage tank and delivering the fuel to a fuel dispenser in a service station environment, comprising:
- a submersible turbine pump, comprising:
  - an electronics; and
  - a boom inside the underground storage tank that is coupled to a turbine housing containing a turbine;
  - said electronics electrically coupled to said turbine to cause said turbine to rotate to generate a pressure in said boom to draw fuel from the underground storage tank; and
- a submersible turbine pump housing that contains said electronics, wherein the submersible turbine pump housing comprises:
  - an input orifice fluidly coupled to said boom; and
  - an output orifice that is adapted to couple to a double-walled fuel pipe having an inner annular space and an outer annular space wherein said inner annular space is fluidly coupled to said input orifice and wherein the inner annular space and the outer annular space are run into the inside of said submersible turbine pump housing when the double-walled fuel pipe is coupled to the output orifice.

2. The device of claim 1, wherein said submersible turbine pump contains a siphon system that generates a pressure in said outer annular space to pressurize said outer annular space.

3. The device of claim 1, wherein said submersible turbine pump housing contains a pressure sensor coupled to said outer annular space that senses the pressure inside said outer annular space to determine if a leak exists in said double-walled fuel pipe.

4. The device of claim 1, wherein said submersible turbine pump housing contains a leak chamber that collects fuel that is leaked from said inner annular space to said outer annular space.

5. The device of claim 1, wherein said outer annular space extends to the fuel dispenser.

6. A system for detecting a leak in a double-walled fuel pipe that carries fuel from an underground storage tank to a fuel dispenser in a service station environment, comprising:
- a submersible turbine pump, comprising:
  - an electronics; and
  - a boom inside the underground storage tank that is coupled to a turbine housing containing a turbine;
  - said electronics electrically coupled to said turbine to cause said turbine to rotate to generate a pressure in said boom to draw fuel from the underground storage tank; and
- a submersible turbine pump housing that contains said electronics, wherein the submersible turbine pump housing comprises:
  - an input orifice fluidly coupled to said boom; and
  - an output orifice that is adapted to couple to a double-walled fuel pipe having an inner annular space and an outer annular space wherein said inner annular space is fluidly coupled to said input orifice and wherein the inner annular space and the outer annular space are run into the inside of said submersible turbine pump housing when the double-walled fuel pipe is coupled to the output orifice; and
- a pressure generating device that generates a pressure in said outer annular space to pressurize said outer annular space.

7. The system of claim 6, wherein said pressure generating device is said submersible turbine pump.

8. The system of claim 7, wherein said submersible turbine pump contains a siphon system that generates the pressure in said outer annular space to pressurize said outer annular space.

9. The system of claim 6, further comprising a pressure sensor coupled to said outer annular space wherein a controller coupled to said pressure sensor monitors the pressure in said outer annular space using said pressure sensor to determine if there is a leak in said double-walled fuel pipe.

10. The system of claim 9, wherein said pressure sensor is inside said outer annular space.

11. The system of claim 9, wherein said pressure sensor is located in said submersible turbine pump housing.

12. The system of claim 9, wherein said controller determines if the pressure in said outer annular space is within a tolerance of a predefined threshold pressure.

13. The system of claim 9, wherein said controller generates an alarm if the pressure in said outer annular space is outside a tolerance of a predefined threshold pressure.

14. The system of claim 9, wherein said controller determines if the pressure in said outer annular space is outside a tolerance of a predefined threshold pressure in a repeatable fashion.

15. The system of claim 9, wherein said controller determines if the pressure in said outer annular space goes beyond a tolerance of a predefined threshold pressure within a predefined threshold time.

16. The system of claim 15, wherein said controller shuts down the submersible turbine pump if the pressure in said outer annular space goes beyond a tolerance of a predefined threshold pressure within a predefined threshold time.

17. The system of claim 15, wherein said controller generates a catastrophic alarm if the pressure in said outer annular space goes beyond a tolerance of a predefined threshold pressure within a predefined threshold time.

18. The system of claim 9, wherein said controller communicates an alarm to a site controller if a leak exists in said double-walled fuel pipe.

19. The system of claim 9, wherein said controller communicates an alarm to a remote system if a leak exists in said double-walled fuel pipe.

20. The system of claim 9, wherein said controller is provided as a part of the group consisting of a site controller and a tank monitor.

21. The system of claim 6, further comprising a leak containment chamber within said submersible turbine pump housing that collects fuel that leaks from said inner annular space to said outer annular space.

22. A device for drawing fuel out of an underground storage tank and delivering the fuel to a fuel dispenser in a service station environment, comprising:
- a submersible turbine pump, comprising:
  - an electronics; and a boom inside the underground storage tank that is coupled to a turbine housing containing a turbine;

said electronics electrically coupled to said turbine to cause said turbine to rotate to generate a pressure in said boom to draw fuel from the underground storage tank; and a submersible turbine pump housing that contains said electronics, wherein the submersible turbine pump housing comprises:

an input orifice fluidly coupled to said boom;

an output orifice that is adapted to couple to an inner annular space of a double-walled fuel pipe wherein said inner annular space is fluidly coupled to said input orifice when the double-walled fuel pipe is coupled to the output orifice; and a second orifice coupled to a bypass tube that is coupled to an outer annular space of said double-walled fuel pipe;

said submersible turbine pump generates a pressure in said bypass tube to pressurize said outer annular space; and said submersible turbine pump housing contains a pressure sensor coupled to said bypass tube that senses the pressure inside said outer annular space to determine if a leak exists in said double-walled fuel pipe.

23. The device of claim 22, wherein said submersible turbine pump contains a siphon system that generates the pressure in said outer annular space to pressurize said outer annular space.

24. The device of claim 22, wherein said submersible turbine pump housing contains a leak chamber that collects fuel that is leaked from said inner annular housing to said outer annular housing.

25. The device of claim 22, wherein said outer annular space extends to the fuel dispenser.

26. A system for detecting a leak in a double-walled fuel pipe that carries fuel from an underground storage tank to a fuel dispenser in a service station environment, comprising:

a submersible turbine pump, comprising:

an electronics; and a boom inside the underground storage tank that is coupled to a turbine housing containing a turbine;

said electronics electrically coupled to said turbine to cause said turbine to rotate to generate a pressure in said boom to draw fuel from the underground storage tank; and a submersible turbine pump housing that contains said electronics, wherein the submersible turbine pump housing comprises:

an input orifice fluidly coupled to said boom;

an output orifice that is adapted to couple to an inner annular space of a double-walled fuel pipe wherein said inner annular space is fluidly coupled to said input orifice when the double-walled fuel pipe is coupled to the output orifice; and a second orifice coupled to a bypass tube that is coupled to an outer annular space of said double-walled fuel pipe; and a pressure generating device that generates a pressure in said bypass tube to pressurize said outer annular space; and a pressure sensor coupled to said bypass tube wherein a controller coupled to said pressure sensor monitors the pressure in said outer annular space using said pressure sensor to determine if there is a leak in said double-walled fuel pipe;

said pressure sensor is located in said submersible turbine pump housing.

27. The system of claim 26, wherein said submersible turbine pump is said pressure generating device.

28. The system of claim 26, wherein said submersible turbine pump contains a siphon system that generates the pressure in said outer annular space to pressurize said outer annular space.

29. The system of claim 26, wherein said pressure sensor is inside said outer annular space.

30. The system of claim 26, wherein said controller determines if the pressure in said outer annular space is within a tolerance of a predefined threshold pressure.

31. The system of claim 26, wherein said controller generates an alarm if the pressure in said outer annular space is outside a tolerance of a predefined threshold pressure.

32. The system of claim 26, wherein said controller determines if the pressure in said outer annular space is outside a tolerance of a predefined threshold pressure in a repeatable fashion.

33. The system of claim 26, wherein said controller determines if the pressure in said outer annular space goes beyond a tolerance of a predefined threshold pressure within a predefined threshold time.

34. The system of claim 33, wherein said controller shuts down the submersible turbine pump if the pressure in said outer annular space goes beyond a tolerance of a predefined threshold pressure within a predefined threshold time.

35. The system of claim 33, wherein said controller generates a catastrophic alarm if the pressure in said outer annular space goes beyond a tolerance of a predefined threshold pressure within a predefined threshold time.

36. The system of claim 26, wherein said controller communicates an alarm to a site controller if a leak exists in said double-walled fuel pipe.

37. The system of claim 26, wherein said controller communicates an alarm to a remote system if a leak exists in said double-walled fuel pipe.

38. The system of claim 26, wherein said controller is provided as a part of the group consisting of a site controller and a tank monitor.

39. The system of claim 26, further comprising a leak containment chamber within said submersible turbine pump housing that collects fuel that leaks from said inner annular space to said outer annular space.

40. A method of collecting leaked fuel in fuel pipe that carries fuel from an underground storage tank to a fuel dispenser, comprising the steps of:

extending a double-walled fuel pipe having an inner annular space and an outer annular space into the inside of a submersible turbine pump housing;

coupling said inner annular space of said double-walled fuel pipe to a turbine that extends into the underground storage tank;

coupling said outer annular space of said double-walled fuel pipe to a leaked fuel collection chamber; and slanting said double-walled fuel pipe so that fuel that leaks from said inner annular space captured by said outer annular space is directed into said fuel collection chamber.

41. The method of claim 40, wherein said leaked fuel collection chamber is inside said submersible turbine pump housing.

42. A method of detecting a leak in a double-walled fuel pipe having an inner annular space and an outer annular space that carries fuel from an underground storage tank to a fuel dispenser, comprising the steps of:

providing a pump in a pump housing that draws fuel out of the underground storage tank into the inner annular space wherein the inner annular space and the outer annular space are coupled to the inside of said pump housing;

generating a pressure in the outer annular space of the double-walled fuel pipe using said pump;

sensing the pressure inside said outer annular space; and determining if the pressure inside said outer annular space is within a tolerance of a threshold pressure value.

43. The method of claim 42, further comprising the step of generating an alarm if the pressure inside said outer annular space is outside a tolerance of a threshold pressure value.

44. The method of claim 43, further comprising the step of communicating said alarm to a remote system.

45. The method of claim 43, further comprising the step of communicating said alarm to a user.

46. The method of claim 42, further comprising the step of shutting down said pump if the pressure inside said outer annular space is outside a tolerance of a threshold pressure value.

47. The method of claim 42, wherein said step of determining further comprises determining if the pressure inside said outer annular space goes beyond a tolerance of a threshold pressure value within a predefined time.

48. The method of claim 42, further comprising the step of generating an alarm if the pressure inside said outer annular space is outside a tolerance of a threshold pressure value in a repeatable fashion.

49. The method of claim 42, further comprising the step of removing the pressure in said outer annular space before said step of determining.

50. The method of claim 49, further comprising the step of reapplying the pressure in said outer annular space after said step of determining to monitor the pressure in said outer annular space to determine if the pressure falls outside said tolerance in a repeatable fashion.

51. A system for capturing a leak in a double-walled fuel pipe that carries fuel from an underground storage tank to a fuel dispenser in a service station environment, comprising:

a submersible turbine pump, comprising:

an electronics; and a boom inside the underground storage tank that is coupled to a turbine housing containing a turbine;

said electronics electrically coupled to said turbine to cause said turbine to rotate to generate a pressure in said boom to draw fuel from the underground storage tank; and a submersible turbine pump housing that contains said electronics, comprising:

an input orifice fluidly coupled to said boom; and an output orifice adapted to couple to a slanted double-walled fuel pipe having an inner annular space and an outer annular space wherein said inner annular space is fluidly coupled to said input orifice and wherein the inner annular space and the outer annular space are coupled to the inside of said submersible turbine pump housing; and a leak containment chamber coupled to said outer annular space such that said leak containment chamber is located equal to or lower than said outer annular space.

* * * * *